(12) United States Patent
Takahashi et al.

(10) Patent No.: US 12,405,251 B2
(45) Date of Patent: Sep. 2, 2025

(54) PIPING WALL THINNING PREDICTION SYSTEM, PIPING SOUNDNESS EVALUATION SYSTEM, AND METHOD

(71) Applicant: Hitachi-GE Nuclear Energy, Ltd., Ibaraki (JP)

(72) Inventors: Shirou Takahashi, Tokyo (JP); Akinori Tamura, Tokyo (JP); Michiaki Kurosaki, Hitachi (JP); Yoshizumi Fukuhara, Hitachi (JP)

(73) Assignee: HITACHI-GE NUCLEAR ENERGY, LTD., Ibaraki (JP)

( * ) Notice: Subject to any disclaimer, the term of this patent is extended or adjusted under 35 U.S.C. 154(b) by 530 days.

(21) Appl. No.: 17/691,156

(22) Filed: Mar. 10, 2022

(65) Prior Publication Data

US 2022/0308016 A1    Sep. 29, 2022

(30) Foreign Application Priority Data

Mar. 24, 2021  (JP) ................................ 2021-049784

(51) Int. Cl.
*G01N 29/07* (2006.01)
*G01N 29/04* (2006.01)

(52) U.S. Cl.
CPC .......... *G01N 29/07* (2013.01); *G01N 29/043* (2013.01); *G01N 2291/02854* (2013.01)

(58) Field of Classification Search
CPC ................ G01N 29/07; G01N 29/043; G01N 2291/02854; G01N 17/00; Y02E 30/30
See application file for complete search history.

(56) References Cited

U.S. PATENT DOCUMENTS

2016/0215918 A1*  7/2016 Cunningham .......... F16L 57/06
2022/0057200 A1   2/2022 Kobayashi et al.

FOREIGN PATENT DOCUMENTS

| JP | 2020-004087 A | 1/2020 |
| JP | 2020-035107 A | 3/2020 |
| JP | 2020-041995 A | 3/2020 |

OTHER PUBLICATIONS

Japanese Office Action received in corresponding Japanese Application No. 2021-049784 dated Jul. 23, 2024.
Kimitoshi Yoneda, Status of Researches on Flow-Accelerated Corrosion, Journal of the Atomic Energy Society of Japan vol. 59, No. 3, 2017.

* cited by examiner

*Primary Examiner* — Tarun Sinha
(74) *Attorney, Agent, or Firm* — MATTINGLY & MALUR, PC

(57) ABSTRACT

The invention provides a piping wall thinning prediction system, a piping soundness evaluation system, and a method which can evaluate a wall thinning amount, a wall thinning rate, and a remaining life at a high speed based on limited actual measurement results, and identify a location requiring monitoring in a piping in a plant. The wall thinning prediction system includes: a first AI evaluation unit configured to evaluate a fluid characteristic value of a piping based on an input value including piping shape information and information of a fluid in the piping; and a second AI evaluation unit configured to evaluate an index related to wall thinning of the piping based on an input value including the fluid characteristic value. The wall thinning prediction system is configured to predict the index related to the wall thinning of the piping.

6 Claims, 2 Drawing Sheets

[FIG. 1]
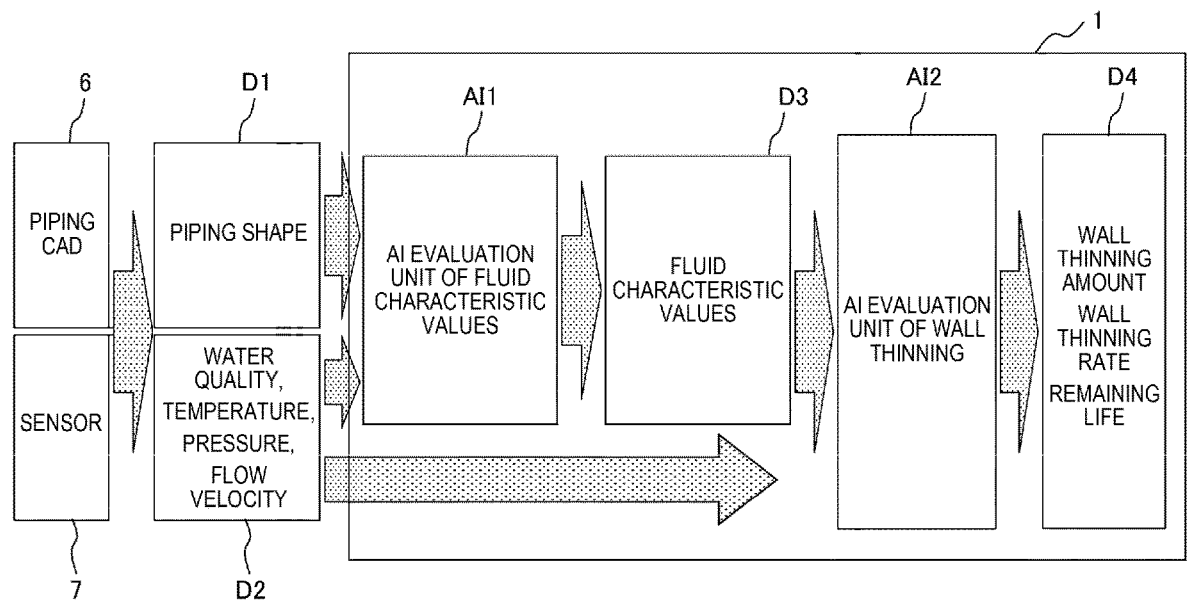
[FIG. 2]
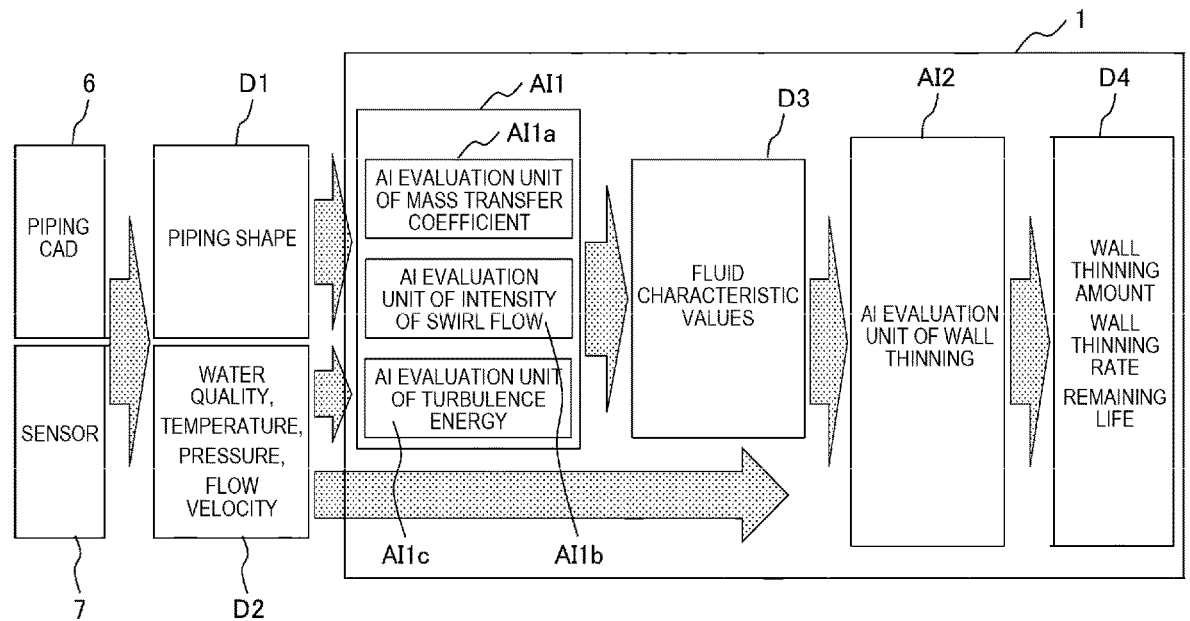

[FIG. 3]
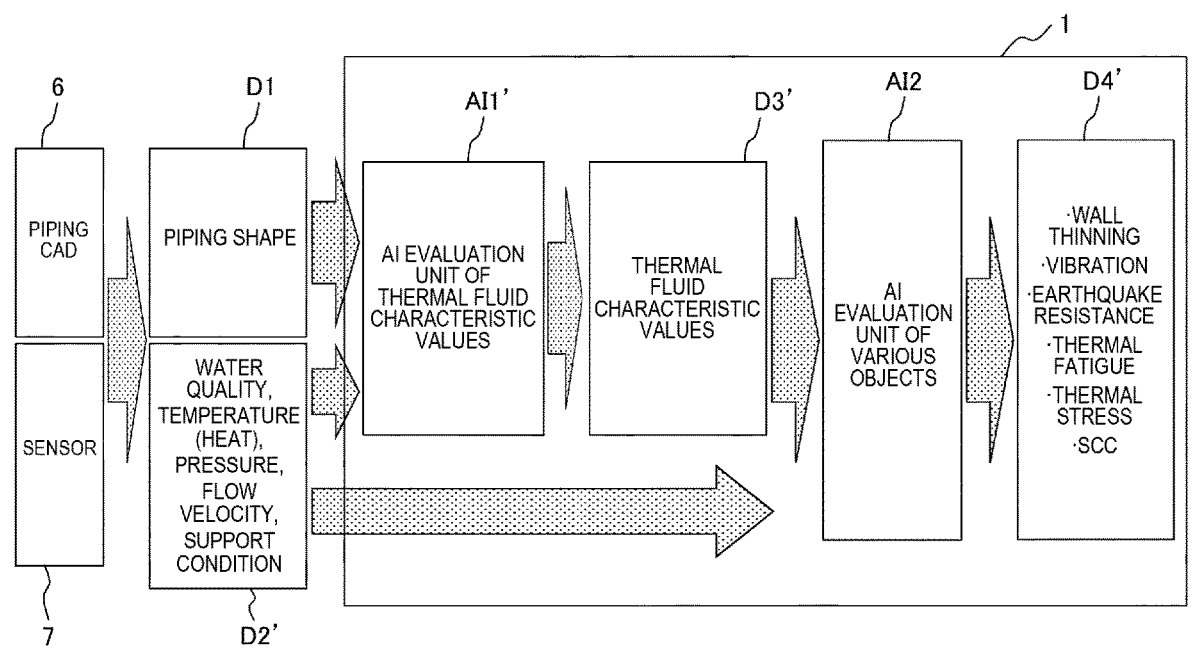

PIPING WALL THINNING PREDICTION SYSTEM, PIPING SOUNDNESS EVALUATION SYSTEM, AND METHOD

CLAIM OF PRIORITY

The present application claims priority from Japanese Patent Application JP 2021-049784 filed on Mar. 24, 2021, the content of which is hereby incorporated by reference into this application.

TECHNICAL FIELD

The present invention relates to a technique for predicting a wall thinning event in a piping and the like and optimizing a piping wall thickness measurement plan using the prediction, in particular, a piping wall thinning prediction system, a piping soundness evaluation system, and a method suitable for various plants such as a nuclear power plant, a thermal power plant, a petroleum refining plant, and a chemical plant, which are required of piping wall thickness measurement at a huge number of locations in order to prevent a wall thinning event caused by a complex flow of a fluid in the piping, such as flow-accelerated corrosion and liquid droplet impingement erosion.

BACKGROUND ART

In various plants, it is known that a wall thinning event in a piping, etc. occurs due to flow-accelerated corrosion, liquid droplet impingement erosion, or the like, depending on a flow and a condition of an internal fluid in the piping, etc. Therefore, in various plants, in order to grasp occurrence and a state of the wall thinning event, a wall thickness of the piping is measured during a periodic inspection period of a plant. However, since it is difficult to predict a location where wall thinning occurs, measuring the wall thickness at a huge number of locations has an adverse effect on shortening the periodic inspection period of the plant and improving an operating rate. In order to solve the problem, an evaluation technique for predicting the location where the wall thinning occurs has been developed.

NPL 1 introduces prediction models and prediction codes for the flow-accelerated corrosion developed in Japan and overseas. The prediction models differ depending on developers, but all the prediction models are methods of calculating a wall thinning rate and a remaining life based on a fluid condition and the like in the piping. Evaluation method in these literatures are constructed based on a physical phenomenon.

CITATION LIST

Non-Patent Literature

NPL 1: "Current status of research on flow-accelerated corrosion," Journal of the Atomic Energy Society of Japan Vol. 59

SUMMARY OF INVENTION

Technical Problem

The methods shown in NPL 1 are constructed based on physical formulas. Events such as the flow-accelerated corrosion are mainly caused by the flow of the fluid in the piping. In various piping shapes in the plant, a flow mechanism is complicated, and thus it is difficult to clarify all the events and reflect the events in physical formulas. In order to improve a prediction accuracy, it is necessary to perform calculation that reflect complicated piping shapes. Therefore, a calculation time including input work becomes long, and it is not feasible to evaluate all the target parts of the piping in the plant, which amount to a huge number of tens of thousands, and narrow down parts having a high risk of wall thinning.

Meanwhile, as one of methods for evaluating the wall thinning at a high speed, it is conceivable to use a method using an artificial intelligence (AI). Although a high-speed evaluation can be performed using the AI, a large number of actual plant measurement results (learning data) are required due to variety of the piping shapes used in the plant. If the amount of the learning data is small, there is a concern of erroneous evaluation of the wall thinning and a deterioration of a prediction accuracy.

In view of the above, the invention provides a piping wall thinning prediction system, a piping soundness evaluation system, and a method which can evaluate a wall thinning amount, a wall thinning rate, and a remaining life at a high speed based on limited actual measurement results (learning data), and identify a location requiring monitoring in a piping in a plant.

Solution to Problem

In order to solve the above problem, the invention provides "a wall thinning prediction system including: a first AI evaluation unit configured to evaluate a fluid characteristic value of a piping based on an input value including piping shape information and information of a fluid in the piping; and a second AI evaluation unit configured to evaluate an index related to wall thinning of the piping based on an input value including the fluid characteristic value, in which wall thinning prediction system is configured to predict the index related to the wall thinning of the piping."

In order to solve the above problem, the invention provides "a piping soundness evaluation system including: a first AI evaluation unit configured to evaluate a thermal fluid characteristic value of a piping based on an input value including piping shape information and information on heat of a fluid in the piping and an indicated condition; and a second AI evaluation unit configured to evaluate an index that enables evaluation of heat-related soundness of the piping, based on an input values including the thermal fluid characteristic value, in which the piping soundness evaluation system is configured to predict the index that enables evaluation of heat-related soundness of the piping."

The invention provides "a wall thinning prediction method including: a step of evaluating, with a first AI evaluation unit, a fluid characteristic value of a piping based on an input value including piping shape information and information of a fluid in the piping; a step of evaluating, with a second AI evaluation unit, an index related to wall thinning of the piping based on an input value including the fluid characteristic value; and a step of predicting the index related to wall thinning of the piping."

The invention provides "a piping soundness evaluation method including: a step of evaluating, with a first AI evaluation unit, a thermal fluid characteristic value of a piping based on an input value including piping shape information and information on heat of a fluid in the piping and an indicated condition; a step of evaluating, with a second AI evaluation unit, an index that enables evaluation of heat-related soundness of the piping, based on an input value including the thermal fluid characteristic value; and a step of predicting the index that enables evaluation of heat-related soundness of the piping."

Advantageous Effect

According to the invention, it is possible to provide a piping wall thinning prediction system and a piping wall thinning prediction method which can evaluate a wall thinning amount, a wall thinning rate, and a remaining life in the piping in a plant with a high accuracy and a high speed using limited actual plant measurement results (learning data), and identify a location requiring monitoring in the piping in the plant.

More specifically, according to embodiments of the invention, it is possible to realize a method for quickly identifying and screening a location having a high risk of wall thinning in a huge amount of the piping in the plant, evaluating the wall thinning amount, the wall thinning rate, and the remaining life at the location having a high risk of wall thinning, and reviewing or optimizing a piping wall thickness measurement plan based on these values. This can contribute to shortening of a periodic inspection period of the plant, prevention of a leakage event due to wall thinning, and further improvement of an operating rate of the plant.

Problems, configurations and effects other than those described above will be clarified by the description of the following embodiment.

BRIEF DESCRIPTION OF DRAWINGS

FIG. 1 is a diagram showing a series of processing steps of piping wall thinning prediction according to a first embodiment of the invention.

FIG. 2 is a diagram showing a series of processing steps of piping wall thinning prediction according to a second embodiment of the invention.

FIG. 3 is a diagram showing a series of processing steps of various objects prediction according to a third embodiment of the invention.

DESCRIPTION OF EMBODIMENTS

Hereinafter, embodiments of the invention will be described with reference to drawings. In the drawings, the same configurations are denoted by the same reference numerals, and a detailed description of repeated parts will be omitted. Hereinafter, a piping wall thinning prediction system and method will be described in a first embodiment, and a piping soundness evaluation system and method will be described in a second embodiment.

First Embodiment

FIG. 1 shows a piping wall thinning prediction system and method according to the first embodiment of the invention. Here, a piping wall thinning prediction system is realized by using a computer, and the computer 1 receives piping shape information D1 from a piping CAD 6 and plant operation condition information D2 from a sensor 7 installed in a plant.

A series of processing functions in the piping wall thinning prediction system 1 according to the invention include a first-stage AI evaluation unit AI1 that evaluates fluid characteristic values D3 of a piping based on input values including the piping shape information D1 and the plant operation condition information D2, and a second-stage AI evaluation unit AI2 that evaluates wall thinning information 4 regarding a wall thinning amount, a wall thinning rate, and a remaining life based on input values including the fluid characteristic value D3 and the plant operation condition information D2.

In a flow of this processing stage, the plurality of AI evaluation units AI1 and AI2 are created in advance based on learning data, and the created plurality of AI evaluation units are used to predict the wall thinning information 4 (the wall thinning amount, the wall thinning rate, and the remaining life) from the piping shape information D1 of the piping CAD 6 and the plant operation condition information D2 from the sensor 7 installed in the plant. The plant operation condition information D2 is a water quality, a temperature, a pressure, a flow velocity, or the like. As the AI, deep learning (neural network) or the like is used.

As described above, the piping wall thinning prediction system 1 of the invention uses two stages of AI evaluation unit to obtain the fluid characteristic values D3 in a first stage and the wall thinning information D4 in a second stage. In this regard, in order to construct a simple single-stage AI evaluation unit in related art, when inputting piping shapes, a large number of actual plant measurement results (learning data) are required due to a variety of the piping shapes. The piping of the plant is a complex combination of various components such as bent pipes, T-shaped pipes, reduction pipes, expansion pipes, orifices, and valves. Usually, actual measurement values measured at the plant are used as the learning data. However, the amount of measured data in the plant is limited because it takes several years to evaluate the actual measurement data. Therefore, it is difficult to secure sufficient learning data that enables an AI evaluation in related art. Meanwhile, the actual measurement results of the plant are the most reliable and quantitative numerical data, and the limited actual measurement results needs to be effectively utilized in order to improve a prediction accuracy.

Therefore, in the invention, in order to solve the above problem, the AI evaluation units are installed in a manner divided into a plurality of stages. The AI evaluation unit AI1 that outputs the fluid characteristic values D3 using an input including complicated piping shapes obtained from the piping CAD 6 is installed in the first stage. The first-stage AI evaluation unit AI1 requires performing AI learning in advance as well.

However, outputs of the first-stage AI evaluation unit AI1 are the fluid characteristic values D3. This means that the fluid characteristic values D3 can create learning data in advance by computational fluid dynamics using the plant operation condition information D2 such as the water quality, the temperature, the pressure, and the flow velocity. That is, the first-stage AI evaluation unit AI1 (weights and biases of the neural network) can be learned using results of the computational fluid dynamics analysis as teacher data. Fluid characteristic values may be classified by a category instead of a numerical value.

Meanwhile, focusing on the piping shapes that are an input of the first-stage AI evaluation unit AI1, the piping shapes are complicated and requires many computational fluid dynamics results, but it is possible to obtain results of the many different piping shapes by performing a simulation calculation.

Next, a specific example of the fluid characteristic values D3 obtained in the first-stage AI evaluation unit AI1 will be described. The fluid characteristic values D3 in the piping include a wall surface shear force due to flow, a mass transfer coefficient, a heat transfer coefficient, a turbulence strength (turbulence energy, turbulence intensity), a swirl flow intensity (swirl number), an eddy viscosity coefficient, a dissipation rate, a flow velocity distribution, a pressure distribution, a vorticity, and the like. These various fluid characteristic values D3 can be obtained from computational fluid dynamics.

FIG. 2 is a diagram showing a specific configuration example of the first-stage AI evaluation unit AI1. Here, as representatives of the above fluid characteristic values D3, the mass transfer coefficient is obtained by an AI evaluation unit AI1a, the intensity of the swirl flow is obtained by an AI evaluation unit AI1b, and the turbulence energy is obtained by an AI evaluation unit AI1c. One or more of these fluid characteristic values D3 are obtained by the first-stage AI evaluation unit AI1, and the wall thinning amount, the wall thinning rate, and the life can be evaluated by inputting the fluid characteristic values D3 into the second AI evaluation unit AI2. An improvement in an accuracy can be expected by using the plurality of fluid characteristic values D3.

In FIG. 1, the second-stage AI evaluation unit AI2 is further installed. The second-stage AI evaluation unit AI2 can evaluate the wall thinning amount as an output based on an input layer including the fluid characteristic values D3 which are the outputs of the first-stage AI evaluation unit AI1. The second-stage AI2 requires performing AI learning in advance as well. Here, indexes related to wall thinning of the piping are exemplified by the wall thinning amount, and may be the wall thinning rate and the remaining life in addition to the wall thinning amount.

However, in this case, the fluid characteristic values D3 as the input may be given as simple numerical values or categories, and since the input of the second-stage AI evaluation unit AI2 does not include the complicated piping shapes, it is possible to construct the second-stage AI evaluation unit AI2 even with a small amount of actual measurement data of the plant. That is, the second-stage AI evaluation unit AI2 (the weights and the biases of the neural network) can be learned using limited actual measurement data (plant operation condition information D2) of the plant as teacher data.

As shown in the above examination, the first-stage AI evaluation unit AI1 learned using the computational fluid dynamics results as the teacher data and the second-stage AI evaluation unit AI2 learned using the actual measurement data D2 of the plant as the teacher data can be feasibly constructed even with a small amount of learning data.

After the learning is completed, an actual operation and the amount of wall thinning amount will be evaluated. By constructing the plurality of stages of AI evaluation units in the computer, and inputting a plant operation condition, a piping shape condition, and the like, the amount of wall thinning amount at each location is evaluated at a high speed by the AI units in plural stages. The wall thinning amount is evaluated by the numerical values when using neural network regression, and by the categories when using classification.

As described above, the plurality of stages of AI evaluation units enable high-speed evaluation of a wall thinning amount in a complex and diverse plant piping based on a small amount of data. Here, a case of two stages has been described, but the number of stages may be further increased.

By using numerical values related to droplets in the piping as the fluid characteristic values, liquid droplet impingement erosion can be evaluated in the same manner. Regarding this problem, the embodiment also includes the first-stage AI evaluation unit AI1 that evaluates the fluid characteristic values of the piping based on the input values including the piping shape information, and the second-stage AI evaluation unit AI2 that evaluates the wall thinning amount based on the fluid characteristic values.

Further, it is desirable that the system in FIG. 1 have a function of predicting the indexes related to wall thinning of the piping and presenting reference information for determining a location having a high risk of wall thinning as a piping wall thickness measurement location.

Second Embodiment

An evaluation unit realized by two stages of AI processing described in the first embodiment can be expanded and applied to a general soundness evaluation index as it is. FIG. 3 is a diagram showing a series of processing steps of various objects prediction according to the invention.

A configuration in FIG. 3 is basically the same as the configuration in FIG. 1. Detection information D2' from the sensor 7 includes information on heat held by a fluid and information on a support condition of a piping. Thermal fluid characteristic values D3' are processed in a first-stage AI unit AI1'. Indexes D4' (a thermal fatigue, a thermal stress, and a stress corrosion cracking (SCC)) that enable evaluation of heat-related soundness are obtained in the second-stage AI unit AI2' in addition to wall thinning.

Using the second embodiment of the invention, various objects such as a piping vibration, an earthquake resistance, the thermal fatigue, the thermal stress, and the SCC can be evaluated in addition to wall thinning by the same method as in the first embodiment. These objects may be evaluated at the same time as wall thinning. For the vibration, the earthquake resistance, and the thermal stress, it is necessary to add the support condition of the piping, such as a support, to the input. Regarding the thermal fatigue and the thermal stress, it is important to input a thermal condition, a temperature condition, and the like. Regarding these problems, the embodiment also includes a first-stage AI evaluation unit that evaluates thermal fluid characteristic values of the piping based on input values including piping shape information, and a second-stage AI evaluation unit that evaluates a wall thinning amount based on input values including the thermal fluid characteristic values. In the case of the vibration and the earthquake resistance, it is conceivable to use a vibration characteristic values in addition to the thermal fluid characteristic values.

As described above, the invention used for the problem of wall thinning can also be used for solving various problems in a plant.

REFERENCE SIGN LIST

D1: piping shape
D2: plant operation condition information
D3: fluid characteristic values
AI1: first-stage AI evaluation unit that evaluates fluid characteristic values of piping
D4: wall thinning amount, wall thinning rate, remaining life
AI2: second-stage AI evaluation unit that evaluates wall thinning amount
6: piping CAD
7: plant sensor

The invention claimed is:
1. A wall thinning prediction system comprising:
a computer programmed to:

receive information of a fluid in a plant from a sensor, receive pipe shape information from Computer Aided Design (CAD) data, execute a first learned artificial intelligence (AI) evaluation unit configured to obtain fluid characteristic values of piping of the plant based on inputs of the received information of the fluid and the pipe shape information, execute a second learned AI evaluation unit configured to obtain an index related to wall thinning of the piping based on the fluid characteristic values obtained from the first learned AI evaluation unit and the received information of the fluid, and predict the index related to the wall thinning of the piping based on the index related to wall thinning obtained by the second learned AI evaluation unit.

2. The wall thinning prediction system according to claim 1, wherein the fluid characteristic value is at least one of a wall surface shear force due to flow, a heat transfer coefficient, a mass transfer coefficient, a turbulence strength, a turbulence energy, a turbulence intensity, a swirl flow intensity, a swirl number, an eddy viscosity coefficient, a dissipation rate, a flow velocity distribution, a pressure distribution, and a vorticity obtained by computational fluid dynamics, and wherein the first learned AI evaluation unit includes a plurality of AI evaluation units configured to evaluate these fluid characteristic values.

3. The wall thinning prediction system according to claim 1, wherein the first learned AI evaluation unit includes an AI evaluation unit configured to evaluate a fluid characteristic value related to a liquid droplet, wherein the wall thinning prediction system is configured to evaluate a wall thinning amount due to liquid droplet impingement erosion.

4. The wall thinning prediction system according to claim 1, wherein the second learned AI evaluation unit is configured to present reference information for determining a location having a high risk of wall thinning as a piping wall thickness measurement location.

5. The wall thinning prediction system according to claim 1, wherein the index related to wall thinning of the piping is one of a wall thinning amount, a wall thinning rate, and a remaining life.

6. A wall thinning prediction method comprising:

receiving information of a fluid in a plant from a sensor;

receiving pipe shape information from Computer Aided Design (CAD) data;

executing a first learned artificial intelligence (AI) evaluation to obtain fluid characteristic values of piping of the plant based inputs of the received information of the fluid and the pipe shape information;

executing a second learned AI evaluation to obtain an index related to wall thinning of the piping based on the fluid characteristic values obtained from the first learned AI evaluation unit and the received information of the fluid; and predicting the index related to wall thinning of the piping based on the index related to wall thinning obtained by the second learned AI evaluation unit.

* * * * *